United States Patent [19]
Henderson et al.

[11] Patent Number: 6,011,545
[45] Date of Patent: Jan. 4, 2000

[54] MULTI-PANEL DIGITIZER

[75] Inventors: Phillip L. Henderson, Doylestown; David J. Porter, Glenside, both of Pa.

[73] Assignee: Numoncis, Inc., Montgomeryville, Pa.

[21] Appl. No.: 08/899,402

[22] Filed: Jul. 23, 1997

[51] Int. Cl.$^7$ .................................................. G09G 3/00
[52] U.S. Cl. .............................. 345/173; 345/1; 345/901; 345/903; 178/18.03
[58] Field of Search ..................................... 345/1–3, 104, 345/173, 174, 177, 179, 182, 156, 901, 350; 178/18.01, 18.03, 18.05, 18.06, 18.07, 18.08, 19.01, 19.02, 19.03, 19.06, 19.07; 434/317

[56] References Cited

U.S. PATENT DOCUMENTS

| | | | |
|---|---|---|---|
| 3,647,963 | 3/1972 | Bailey | 178/18.07 |
| 3,801,733 | 4/1974 | Bailey | 178/18.05 |
| 4,552,991 | 11/1985 | Hulls | 178/20.04 |
| 4,570,033 | 2/1986 | Hulls | 178/20.04 |
| 4,734,546 | 3/1988 | Landmeier | 178/18.07 |
| 5,049,862 | 9/1991 | Dao et al. | 345/179 |
| 5,162,782 | 11/1992 | Yoshioka | 345/173 |
| 5,210,380 | 5/1993 | McDermott et al. | 178/18.07 |
| 5,467,102 | 11/1995 | Kuro et al. | 345/901 |
| 5,484,292 | 1/1996 | McTaggart | 345/901 |
| 5,534,892 | 7/1996 | Tagawa | 345/173 |

*Primary Examiner*—Lun-Yi Lao
*Attorney, Agent, or Firm*—Paul & Paul

[57] ABSTRACT

A graphic input system incorporates a digitizing tablet as an input surface. The digitizing tablet is comprised of two or more separate panels which are positioned adjacent to one another and may also comprise a mechanism for connecting the panels together, such as a hinge. The digitizing tablet, even though it is comprised of separate panels, operates as if the separate panels form a single coordinate system.

10 Claims, 7 Drawing Sheets

MULTI-PANEL DIGITIZER

BACKGROUND OF THE INVENTION

1. Field of the Invention

The present invention relates generally to graphic input systems and more particularly to digitizing tablets utilized in connection with graphic input systems.

2. Brief Description of the Prior Art

Graphic input systems are conventionally known which operate to generate electrical signals that represent the position of a pen or other mechanism relative to an input surface. The electrical signals generated are then stored so that the information written on the input surface may be reproduced at some later point.

Examples of a graphic input system are illustrated in U.S. Pat. Nos. 4,570,033 and 4,552,991, each to Leonard R. Hulls, our co-pending U.S. patent application Ser. No. 08/548,283 (hereinafter the "'283 application") filed Oct. 25, 1995, which are each assigned to the assignee of the present invention, and U.S. Pat. Nos. 3,801,733 and 3,647,963 to Bailey, all of which are incorporated by reference herein. As illustrated in the '283 application, a graphic input system incorporates as the input surface a digitizing tablet which generally is comprised of a flat surface and a system of grid wires usually mounted just beneath or contained within the flat surface. In operation of the graphic input system, graphical material to be digitized, such as a document, is placed upon the surface of the digitizing tablet and a specialized pen is positioned as required upon the document to digitize the information relative to an XY coordinate measurement system.

Most of the conventional methods used for implementing an XY coordinate system of a digitizer tablet, such as is shown in the foregoing patents, employ a grid of conductors of some type mounted under the work surface and a coil, which is driven with AC current, mounted in the digitizer pointing device. The coil generates an alternating magnetic field which couples a voltage into the grid of conductors. The voltage in the grid is sensed and processed to determine the XY position of the magnetic field. It is also possible to reverse the roles of the grid and coil, so that the grid is driven and the coil is the sense element.

Many of the most effective methods utilized for implementing the needed measurement system, especially for large scale digitizers, involves using a serpentine shape for the basic grid elements. Grid elements of this type are placed at right angles to each other to generate both X and Y coordinate values. As illustrated in the foregoing prior art, layers of grid elements are combined to produce an effective XY coordinate measurement system. All of these methods rely on the fact that the amplitude of the voltage, induced in the grid element by the AC excited coil, varies in an approximately sinusoidal fashion as the coil is moved across the coil elements perpendicular to the main conductor paths. When the grids are properly constructed, as described in the above referenced patents, this voltage pattern is largely independent of the position of the coil along the axis parallel to the main conductor paths. There are edge effects which cause the measurement system to break down as the coil approaches the edges of the grid pattern. For most conventional digitizing tablet applications, an inactive area a few centimeters wide around the outside of the work surface is perfectly acceptable.

Digitizing tablets have been in use for years and application of the technology has diversified dramatically over the past few years. For example, digitizing tablets are no longer restricted to use as CAD station accessories and are finding application in a variety of other office product applications, such as in electronic whiteboards and interactive computer display systems.

Whiteboards are ordinarily utilized for taking notes or presenting and sharing ideas in small group meetings and in more formal presentations. Electronic whiteboards were developed to provide a means of capturing, electronically, the notes and diagrams that are written on the whiteboard during a meeting, which allows the information that was written on the board to be saved and distributed after the meeting is over. A limitation observed with electronic whiteboards is that they are relatively small in size and, as a result, have more limited applications than conventional whiteboards which are often used in classrooms and meeting rooms that are very large, with the whiteboard sometimes occupying an entire wall.

A similar requirement exists in the digitizer technology when it is used in interactive computer display systems, such as for computer generated presentations. As computers and screen projector systems have become smaller and more portable, there is seen a demand for the digitizer, which serves as an interactive projection surface, to also be made portable.

In view of the prior art noted above, there is seen a need for a digitizing tablet that is larger in size and, where desired, can be made portable for ease of use.

SUMMARY OF THE INVENTION

The present invention discloses a digitizing tablet constructed of two or more separate panels. For this purpose, the digitizing tablet comprises a plurality of panels defined by at least two panels which are positioned adjacent to one another and a continuous conductive grid structure provided by a combination of individual grid elements disposed within each panel. The digitizing tablet can also comprise means for connecting the at least two panels.

In accordance with the present invention, an object is to provide a novel digitizing tablet comprised of separate individual panels.

It is another object of the present invention to provide a portable digitizing tablet for use as, for example, an electronic whiteboard or in an interactive computer display system.

It is another object of the present invention to provide a digitizing tablet comprised of multiple panels in which the panels are connected to one another for ease of operation, for example, for easier assembly and disassembly.

It is still another object of the present invention to provide a novel grid structure for use in multiple panels so that the multiple panels when placed together will appear, electrically, to be one large continuous grid.

These and other objects of the present invention will become more readily apparent when taken into consideration with the following description and the attached drawings.

DETAILED DESCRIPTION OF THE PREFERRED EMBODIMENTS

Figure 1:
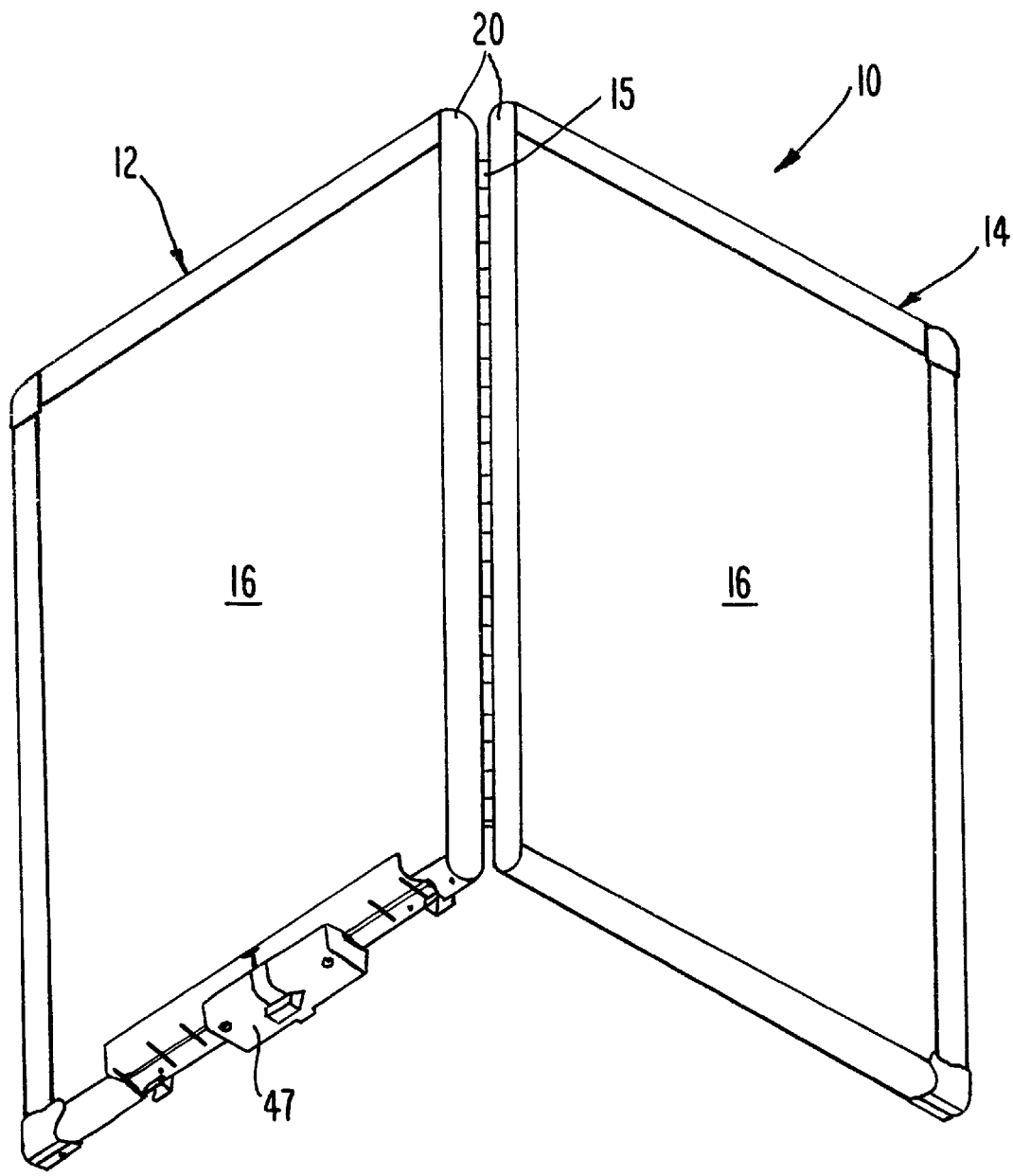
FIG. 1 is a perspective view of a digitizing tablet in accordance with an embodiment of the present invention, shown in a partially opened position.

Referring now to the drawings in detail, wherein like reference numerals indicate like elements throughout the several views, there is shown in FIG. 1 a digitizing tablet in accordance with an embodiment of the present invention. The digitizing tablet 10 includes, as portions thereof, two panels, 12 and 14, respectively. It should be understood that the two panels 12 and 14 are for illustration purposes only and the digitizing tablet 10 can be comprised of any number of panels.

Figure 2:
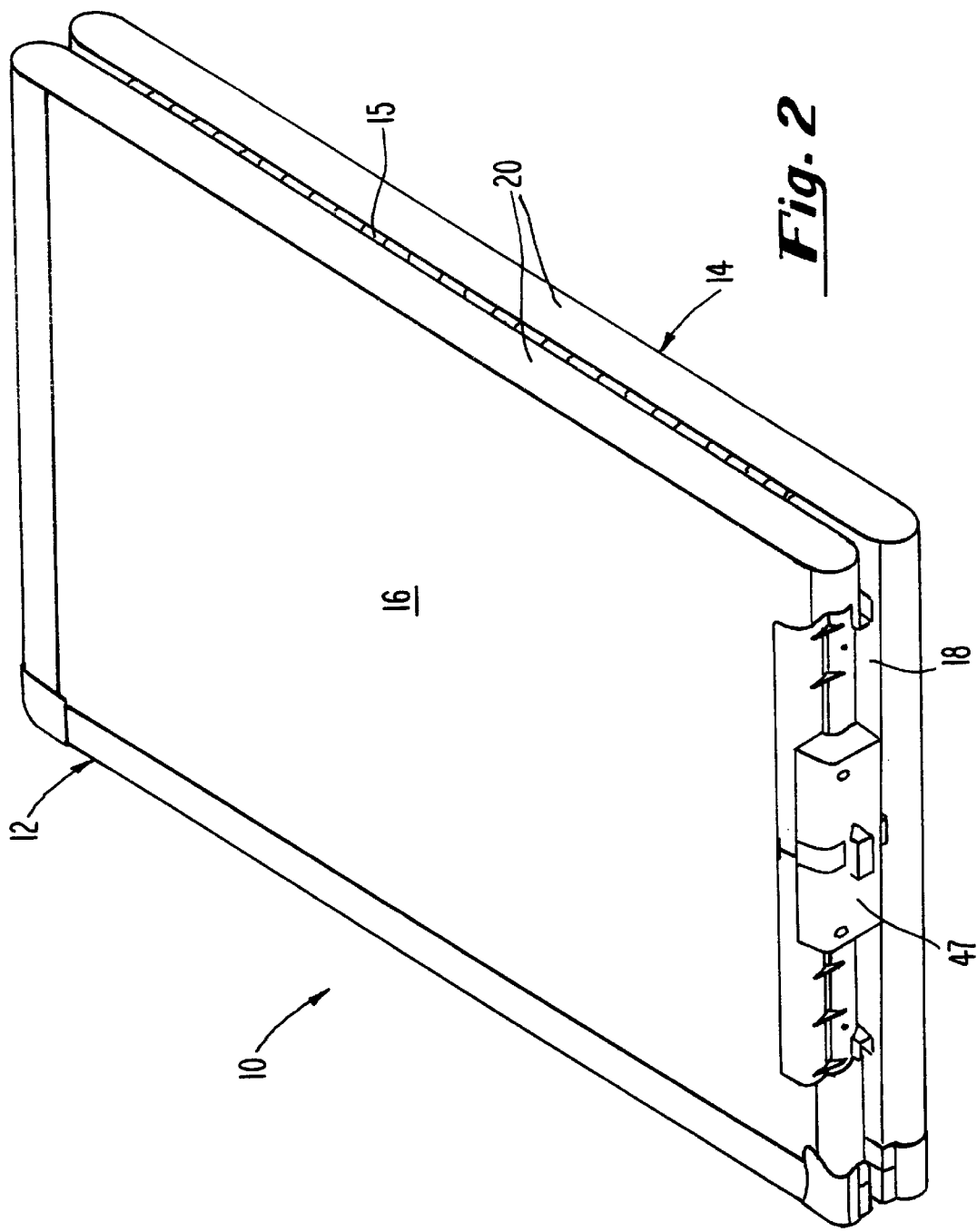
FIG. 2 is a perspective view of the digitizing tablet of FIG. 1, shown in a closed position.
Figure 3:
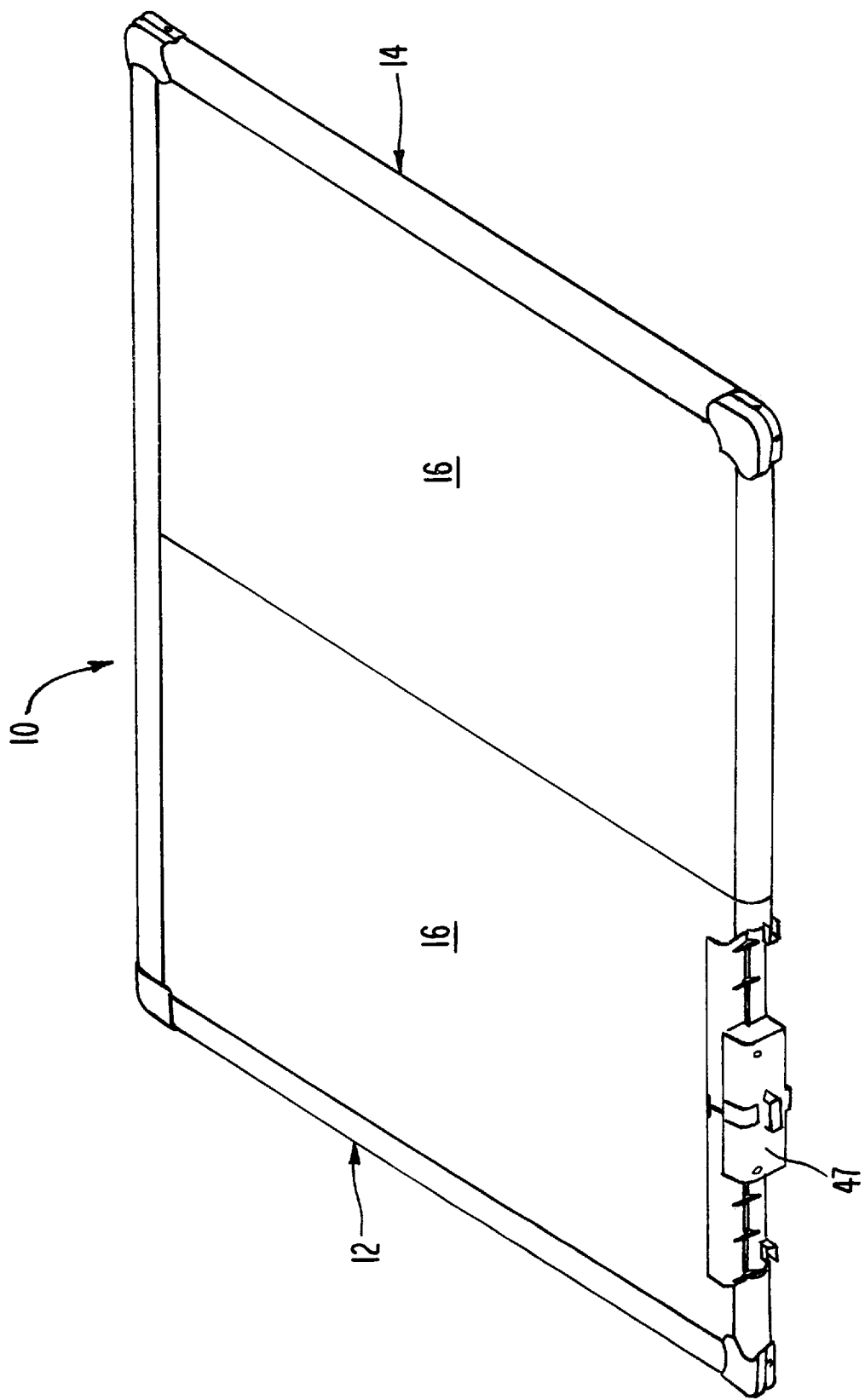
FIG. 3 is a perspective view of the digitizing tablet of FIG. 1, shown in an open position.

In the present embodiment, as is shown in FIGS. 1 and 2, each panel is substantially square in configuration defined by an upper surface 16, a lower surface 18 generally opposing the upper surface 16 (only one of which is visible in FIG. 2) and in this embodiment at least one and as many as four connecting surfaces between the upper and lower surfaces 16 and 18, with each connecting surface being positioned at one of the four sides of the square shaped panels. As is shown in the FIG. 3, the two panels 12 and 14 are positioned adjacent to one another and with preferably one connecting surface 20 of each of the two panels abutting together. As will be described in more detail below, in the present embodiment, preferably the digitizing tablet 10 also comprises attachment means 15 connecting the two panels 12 and 14 together.

As described earlier, in prior art devices there is an inactive area at the edges of the surface of the digitizing tablet. However, in the present embodiment, an inactive area is unacceptable along the edges where two panels are butted together, and preferably the coordinate system should be continuous across the seam between adjacent panels. For this to be possible, it is necessary to devise a grid structure which produces a pattern of induced voltages in the grid that is continuous across the mechanical seam in the structure.

Figure 4:
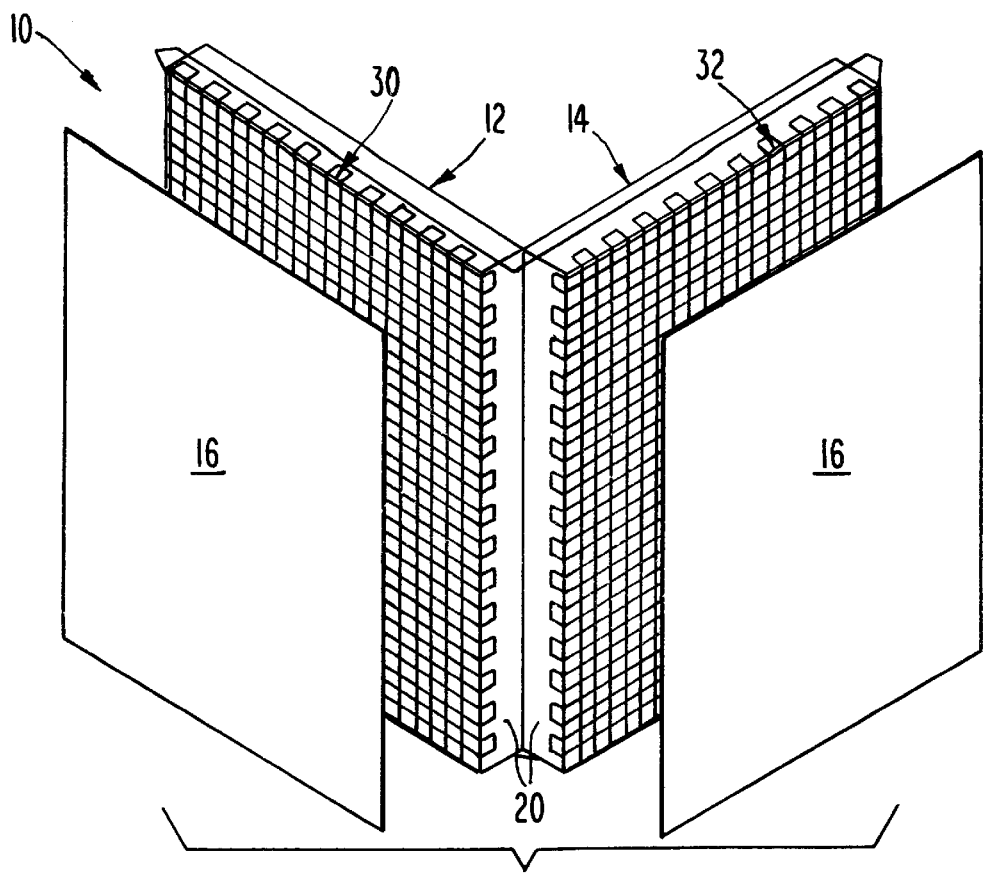
FIG. 4 is a partially exploded perspective view of the digitizing tablet of FIG. 1.

As is shown in the partially exploded view of FIG. 4, the digitizing tablet 10 comprises a conductor system or "grid" arranged within the panels 12 and 14. In this embodiment, a two layer conductor grid is shown and the combination of individual grid elements disposed within each one of the panels 12 and 14 function as a continuous conductor grid, which will be described in more detail hereinafter. As should be understood, any desired number of layers of grid elements can be provided in accordance with the present invention. For example, a single axis can be constructed with one layer. A preferred number of layers of grid elements is four per axis and a more preferred number of layers of grid elements is six per axis. Examples are shown in U.S. Pat. Nos. 4,570,033 and 4,552,991. The adjacent layers of grid elements can either be identical or, if desired, different in structure.

Figure 6:
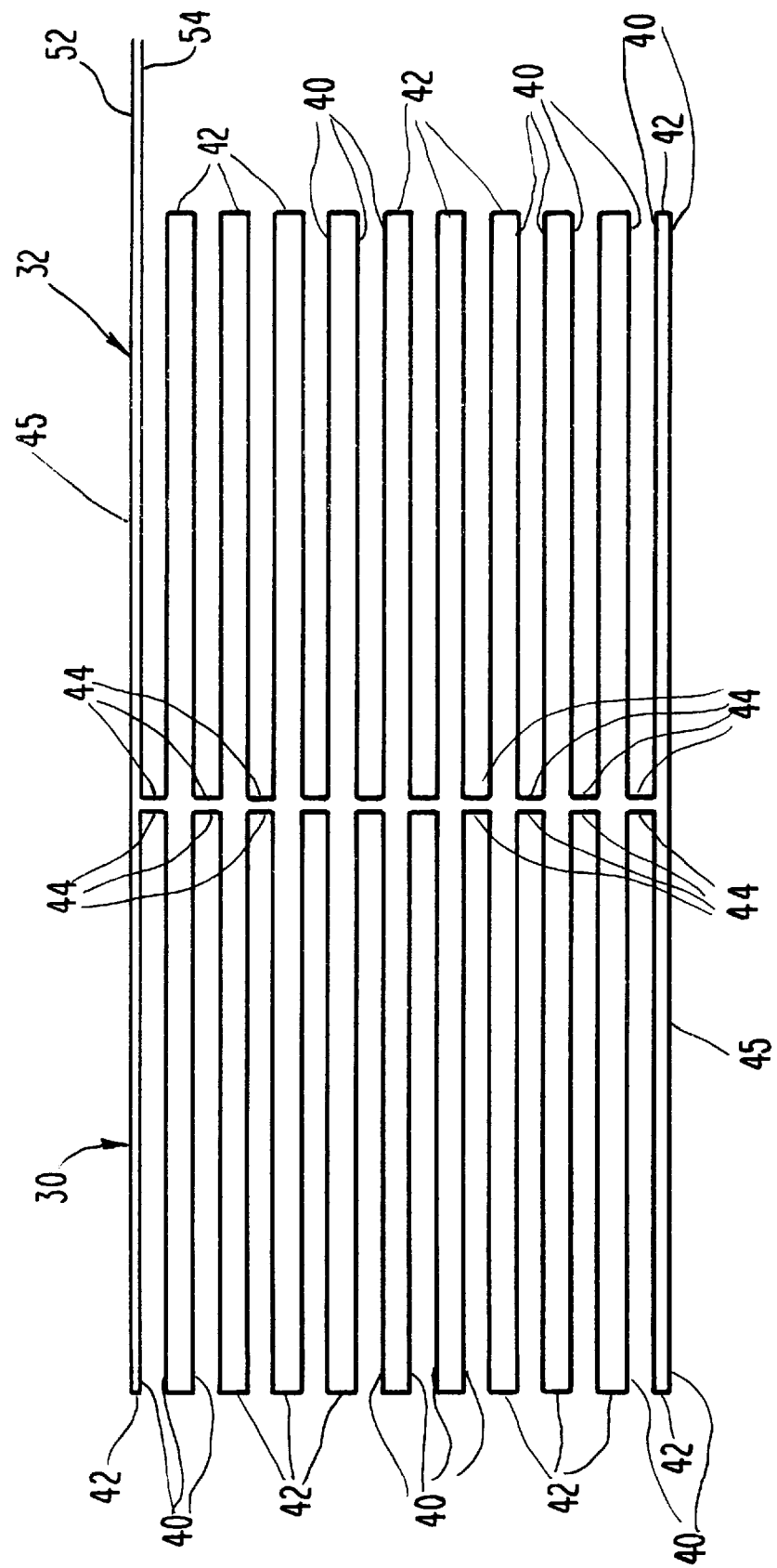
FIG. 6 is a first embodiment of continuous conductor grid in accordance with the digitizing tablet of FIG. 1.

As noted above, an object of the present invention is to provide a continuous conductor grid based on the combination of individual grid elements disposed within the individual panels. In FIG. 6 is shown a first embodiment of a continuous conductor grid, which is comprised of two physically separate grid elements 30 and 32 that are disposed within the respective panels 12 and 14. The patterns of the grid elements 30 and 32 are substantially identical, with each comprising a plurality of equally spaced parallel portions 40, and a plurality of outer and inner attaching portions 42 and 44 respectively, which operate to connect opposing ends of adjacent parallel portions 40 so as to form a continuous structure for each of the grid elements 30 and 32. In addition, provided are at least one, and in this embodiment, preferably two terminating portions 45, which are positioned at outer ends of the parallel portions 40. In the present embodiment, the terminating portions 45 of the grid elements 30 and 32 are connected together forming a continuous section, and a gap or space is positioned between the opposing attaching portions 44 of the grid elements 30 and 32, which will be described in more detail below. In addition, in this embodiment the grid element 32 is provided with two end portions 52 and 54, which are connected to a suitable voltage or current measurement circuit or system, such as is shown at 47 in FIG. 1 and which houses the electronics of the device.

Figure 5:
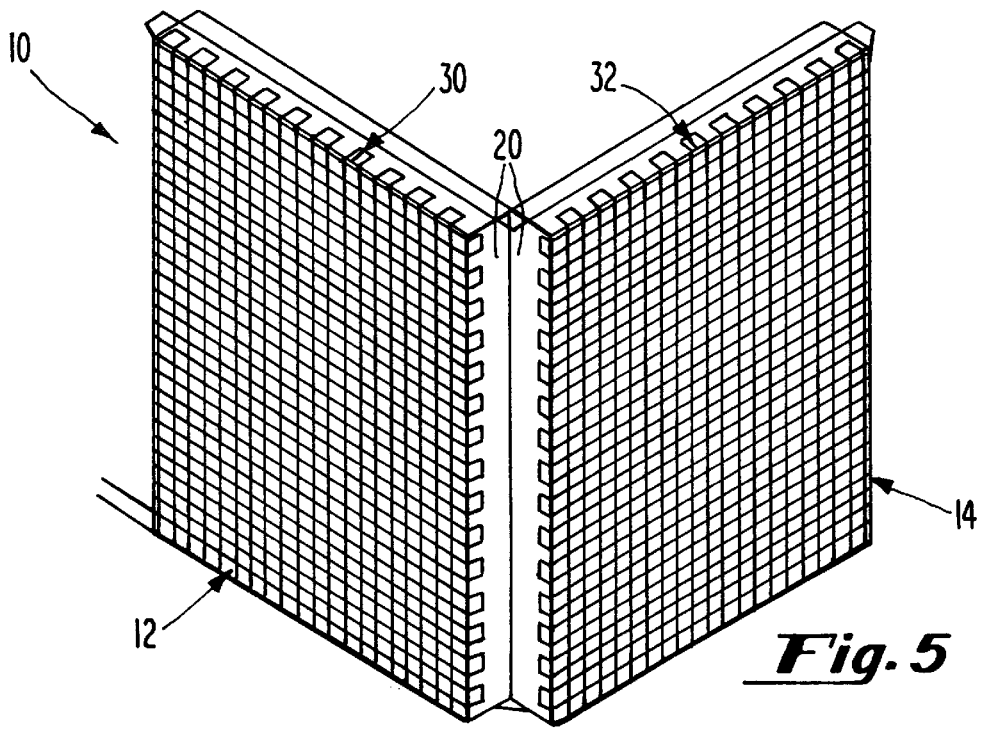
FIG. 5 is a perspective view of the digitizing tablet of FIG. 4, showing a conductor system arranged within opposing panels.

In FIGS. 4 and 5, the grid elements 30 and 32 are illustrated disposed in the panels 12 and 14 as the first layer of the two layers shown. The outer and inner attaching portions 42 and 44 as shown in FIGS. 4 and 5 are preferably bent at approximately 90° over the edge of the panel. The gap or space as shown between the attaching portions 44 of the grid elements 30 and 32 in FIG. 6 is shown in more detail in FIGS. 1 and 4 as the gap between the two respective panels 12 and 14. The position of the grid elements 30 and 32 shown in FIG. 6 is representative of the position occurring when the panels 12 and 14 are positioned butted together in the manner shown in FIG. 3. In the illustrated embodiment shown in FIG. 6, while the terminating portions 45 of the grid elements 30 and 32, which comprise the continuous section, are permanently secured together, it should be understood that the terminating portions 45 can also be separate from one another and which only need to come into electrical contact with one another when the panels 12 and 14 are moved into the position butted together shown in FIG. 3, for example two connectors placed in the line 45 at the seam between the two panels 12 and 14.

The operation of the continuous conductor grid of the first embodiment will now be described for a single coordinate axis. In accordance with one aspect of the present invention, the digitizing tablet 10 is comprised of two separate panels 12 and 14, and which in operation function as a single digitizing device, such as conventional devices shown in the prior art patents earlier recited. In the present embodiment, the functioning of a single digitizing device is accomplished by the position and orientation of the attaching portions 44 of the grid elements 30 and 32 relative to one another. As is shown in FIG. 6, the grid elements 30 and 32 are preferably positioned so that the attaching portions 44 are opposing each other and as close together as possible, which occur at the seam between the two panels 12 and 14 when in an open position shown in FIG. 3. In operation, a coil, such as a conventional digitizing pen, exited with AC current, when it is passed over the grid elements 30 and 32 in the vicinity of the seam, will induce the same voltage in both of the opposing attaching portions 44. However, due to the manner in which the grid elements 30 and 32 are connected together, the voltage in the attaching portions 44 of the grid element 30 will be the opposite polarity to the voltage in the opposing attaching portions 44 of the grid element 32. The result is that the net voltage induced into the opposing attaching portions 44 is zero, so that the net voltage induced into the digitizing tablet 10 is identical to the voltage that would be induced into one large digitizing tablet in which no seam in the middle would be present. In this manner, the seam appears transparent.

Figure 7:
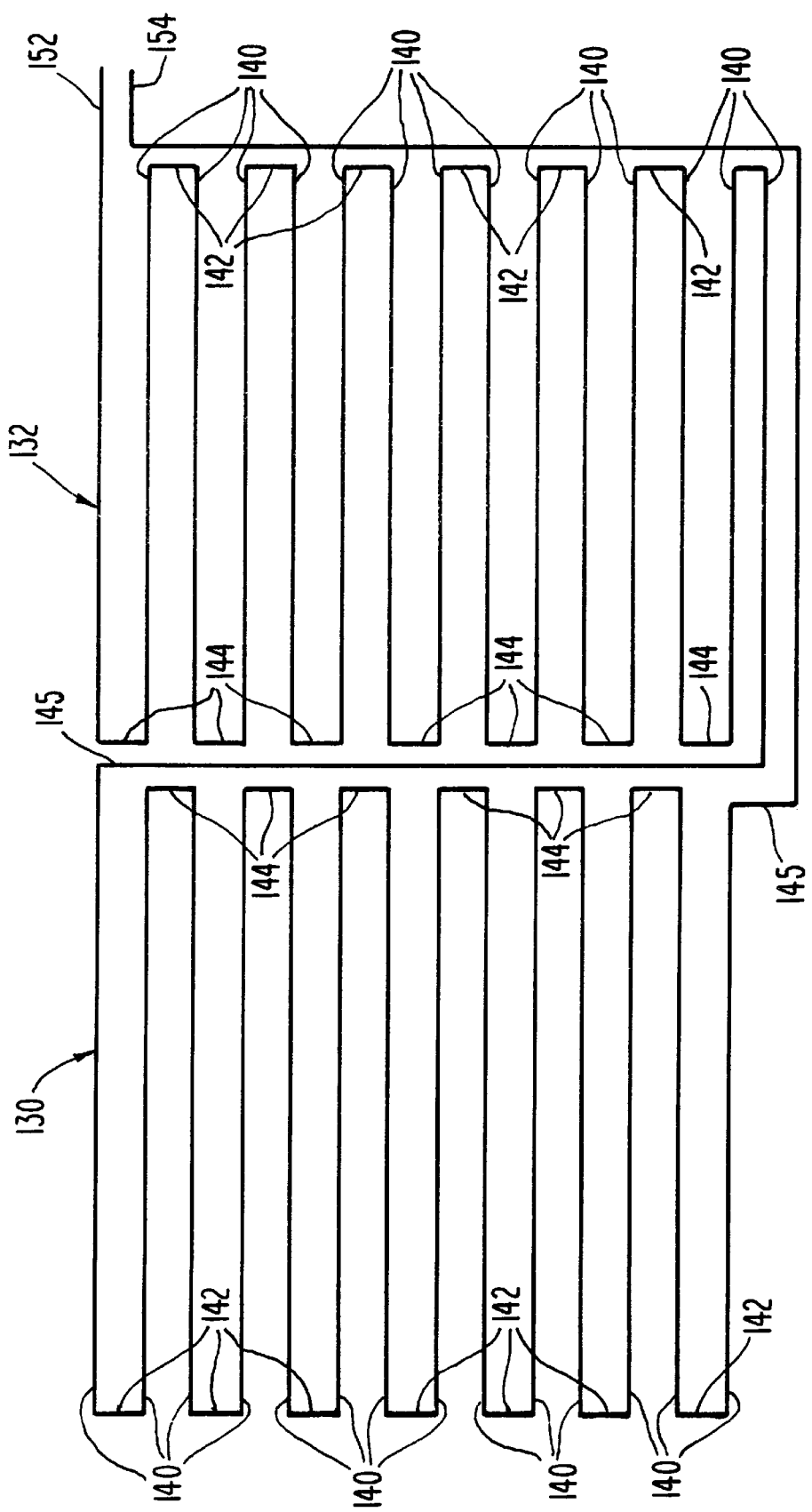
FIG. 7 is a preferred embodiment of a continuous conductor grid in accordance with the digitizing tablet of FIG. 1.

A presently preferred embodiment of a continuous conductor grid in accordance with the present invention is shown in FIG. 7 for a single coordinate axis comprising the grid elements 130 and 132. In this embodiment, the configuration of the grid elements 130 and 132 are positioned somewhat differently relative to each other than the grid elements 30 and 32, and the continuous section comprising in this embodiment two terminating portions 145 connecting the two grid elements 130 and 132, respectively, at least one of which preferably passes through the seam area which, while not shown, would occur between the two panels in which the grid elements 130 and 132 would be disposed. Similar to the first embodiment, the continuous conductor grid of the present embodiment is comprised of a plurality of equally spaced parallel portions 140 and a plurality of outer and inner attaching portions 142 and 144, respectively, which connect opposing ends of adjacent parallel portions 140 so as to form a continuous grid element. In addition, the grid element 132 is provided with two end portions 152 and 154 which are connected to a suitable voltage or current measurement circuit or system. One difference in the present embodiment is that the position of the attaching portions 144 of the grid elements 130 and 132 are offset relative to each other. Further, as noted above, one of the two terminating portions 145 passes through the seam area between the attaching portions 144 of the grid elements 130 and 132. Similar to that described in connection with the first embodiment, the continuous section 145 can be a fixed connection between the grid elements 130 and 132 or, alternatively, the continuous section 145 can be divided, such that the grid elements 130 and 132 are only connected, either physically or electrically, when the corresponding panels into which the grid elements 130 and 132 are mounted would be moved into the position shown in FIG. 3. The continuous section 145 between the inner attaching portions 144 of grid elements 130 and 132 can be disposed within one or both of the panels 12 and 14.

The operation of a digitizing tablet such as shown in FIG. 1 having the grid elements 130 and 132 mounted therein will now be described. A coil when brought close enough to the seam to induce a voltage in one of the attaching portions 144 of the grid elements 130 or 132, will induce a voltage in the continuous section 145 between the attaching portions 144 of the grid elements 130 and 132. The voltage induced into the continuous section 145 is of the same magnitude but opposite polarity to the voltage of the attaching portions 144. The voltages of the attaching portions 144 and continuous section 145 therefore operate to cancel each other, so that the net voltage induced into the total combined grid structure by the coil is the same as the voltage that would be induced into one large continuous conductor grid.

Figure 8:
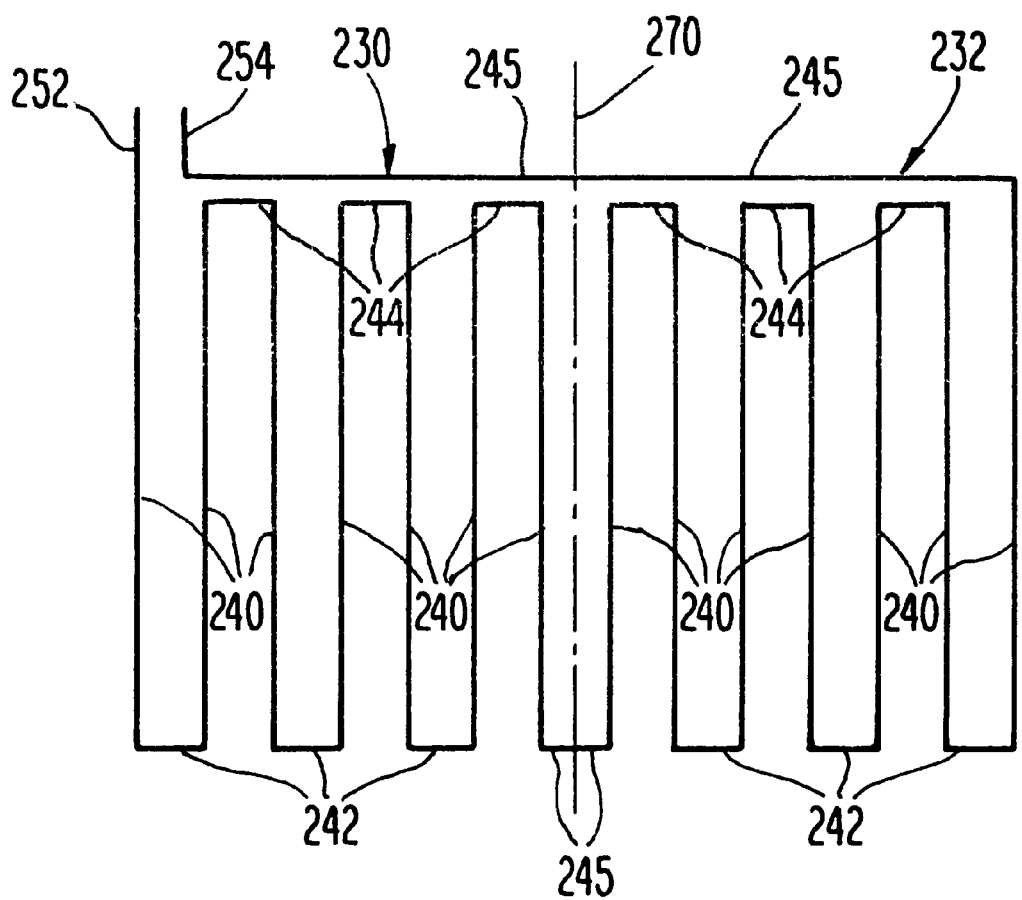
FIG. 8 is a third embodiment of a continuous conductor grid in accordance with the digitizing tablet of FIG. 1.

A third embodiment of a continuous conductor grid in accordance with the present invention is shown in FIG. 8 for a single coordinate axis comprising the grid elements 230 and 232. Similar to the first and preferred embodiments of a continuous conductor grid earlier described, the conductor grid of the present embodiment comprises a plurality of equally spaced parallel portions 240, a plurality of attaching portions 242 and 244 connecting opposing ends of adjacent parallel portions 240, and preferably two terminating portions 245 forming two opposing continuous sections, and which are adapted to pass through the seam area between two panels shown at 270 in dotted lines. Similar to that earlier described, the continuous section 245 can be either a fixed connection between the grid elements 230 and 232 or, alternatively, divided so that the grid elements 230 and 232 are only connected, either physically or electrically, when the corresponding panels into which the grid elements 230 and 232 are mounted would be moved into the position shown in FIG. 3. In addition, preferably the grid element 230 is provided with two end portions 252 and 254 for connection to a suitable voltage or current measurement circuit or system.

The operation of a digitizing tablet shown in FIG. 1 and incorporating a continuous conductor grid in accordance with the third embodiment will now be described. In operation, the combination of the grid elements 230 and 232 function as a single continuous large grid having a single axis coordinate system. This particular function is due to the fact that the dividing line between the grid elements 230 and 232 occurs parallel to the plurality of equally spaced parallel portions 240, so that the division occurs between a single attaching portion 242. In this same manner, where more than two panels would be utilized, one or more additional divisions similar to the seam 270 would be provided between other attaching portions 242 and/or 244.

In a preferred digitizing tablet in accordance with the present invention, such as shown in FIGS. 4 and 5, a full xy coordinate system would be provided by the first conductor grid layer which would comprise either the continuous conductor grid in accordance with the first or preferred embodiments of the present invention having their main grid elements comprising the parallel portions 40 and 140 running perpendicular to the seam, and the second conductor grid layer which would comprise a continuous conductor grid in accordance with the third embodiment of the present invention and rotated 90° having their main grid elements comprising the parallel portions 240 running parallel to the seam, such as in the manner illustrated. As noted earlier, more than one layer of conductor grids per axis can be utilized, such as the preferred number of four layers per axis and more preferred number of six layers per axis.

As noted earlier, preferably the digitizing tablet 10 also comprised attachment means 15 connecting the two panels 12 and 14 together. In the present embodiment, the two panels 12 and 14 are pivotally connected together by a hinge, such as a conventional hinge. In the present embodiment, as best illustrated in FIGS. 13, the hinge is preferably adapted to rotate between a closed position shown in FIG. 2, with the lower surfaces 18 of the respective panels 12 and 14 adjacent to one another and an open position shown in FIG. 3, with one of the connecting surfaces 20 of the two panels 12 and 14 adjacent and preferably abutting together.

In view of that set forth above, it should be understood that there are several advantages of the present invention. One particular advantage is that a digitizing tablet made up of a plurality of panels is provided and which operates in a manner such that a single XY coordinate measurement system is provided. This aspect of the invention is accomplished by forming a continuous conductor grid through the combination of individual grid elements disposed within each of the panels. For this purpose, there are three embodiments disclosed for a continuous conductor grid. In accordance with the third embodiment of the present invention, a continuous conductor grid can be divided into two or more sections, depending upon the number of panels. As earlier described, the division in this particular continuous conductor grid is made parallel to the parallel portions 240, which are the main conductor paths, and are preferably between an attaching portion 44 which, in this embodiment, are perpendicular to the main conductor paths. In this manner, the attaching portion 44 would then need to have either a flexible or breakable connection in the short leg of the grid conductor which spans the physical break, which is earlier described as the continuous section comprised of terminating portions 245.

As noted above, the third embodiment of the continuous conductor grid illustrates a division running parallel to the main conductor paths of one continuous large grid structure. In contrast, it would be physically impractical to divide one continuous large grid structure by a division running perpendicular to the main conductor paths, since it would be required to break or flex all of the parallel portions comprising the main conductor paths which would cross the physical break line. In view of which, the present invention provides a grid structure for dealing with this problem. In accordance with the present invention, two different embodiments are disclosed. In both examples, two electrical connections, per basic grid element, are required across the dividing line. A first embodiment of a continuous conductor grid is illustrated in FIG. 6 and a preferred embodiment of a continuous conductor grid is illustrated in FIG. 7.

In accordance with that set forth above, it should be understood that the combination of the continuous conductor grid in accordance with the third embodiment with either one of the continuous conductor grids in accordance with the first or preferred embodiments of the present invention in a digitizing tablet provides an effective XY coordinate measurement system.

Another advantage of the present invention is that multiple panels can be connected together and preferably pivotally connected together by a hinge, which makes for easier use of the device, such as for easier assembly and disassembly for portable use.

It will be recognized by those skilled in the art that changes may be made by the above-described embodiments of the invention without departing from the broad inventive concepts thereof. In particular, where attachment means connecting the panels together are provided, while the digitizing tablet 10 is shown pivotally connected by a hinge, it should be understood that any other connecting mechanism can be utilized to provide either a fixed connection, such as being pivotally connected or otherwise not pivotally connected, or a connection that provides for connection and disassembly of respective panels; some examples are a ball and joint connection, nut and bolt combination and VELCRO®, to name just a few. In addition, as earlier described, the digitizing tablet in accordance with the present invention can comprise any number of panels which may or may not be connected together by one or more attachment means. In addition, in some applications, it may be desired that two or more panels be connected together by attachment means, however, with the respective panels including conventional grid elements, such as the type shown in the prior art earlier recited, rather than the three embodiments of the continuous conductor grid described above. Similarly, in some applications it may be desired to provide a digitizing tablet comprised of two or more panels and including one or more of the continuous conductor grids in accordance with the first, preferred and third embodiments earlier described, but without attachment means between any of the panels. It is understood, therefore, that this invention is not limited to the particular embodiments disclosed, but is intended to cover all modifications which are within the scope and spirit of the invention as defined by the appended claims.

We claim:

1. A digitizing tablet comprising:

at least two panels, and means for connecting said at least two panels;
wherein said digitizing tablet further comprises grid means disposed within each of said at least two panels for generating a single continuous conductor grid defining a single XY coordinate system, and
wherein said at least two panels are adjacent to each other defining a seam therebetween, wherein said grid means defines at least a first grid element within a first of said at least two panels and a second grid element within a second of said at least two panels, wherein a coil, when placed proximate said seam, induces a same but opposite voltage in said first grid element and said second grid element so that a net voltage is zero, whereby said seam is transparent so as to generate said single continuous conductor grid.

2. A digitizing tablet according to claim 1, wherein said connecting means comprises means for pivotally connecting said at least two panels.

3. A digitizing tablet according to claim 2, wherein said pivotally connecting means comprises a hinge.

4. A digitizing tablet according to claim 1, wherein a seam is defined between said at least two panels and said single XY coordinate system defines at least one axis continuous across said seam.

5. A digitizing tablet comprising:

a plurality of panels, each one of said plurality of panels having generally opposing upper and lower surfaces and at least one connecting surface between said upper and lower surfaces, said connecting surface of each one of said plurality of panels is adapted to be positioned adjacent the connecting surface of at least one other of said plurality of panels, defining a seam between said one and said other of said plurality of panels, and a continuous conductor grid structure defined by a combination of individual grid elements disposed within each one of said plurality of panels when said connecting surfaces of said plurality of panels are positioned adjacent to each other, wherein each of said individual grid elements comprises:
a plurality of spaced generally parallel portions,
a plurality of attaching portions for connecting adjacent generally parallel portions, and at least one terminating portion, wherein at least when said connecting surface of said one of said plurality of panels is adjacent to the connecting surface of said at least one other of said plurality of panels, said at least one terminating portions of said one and said at least other of said plurality of panels are positioned sufficiently proximate to each other so as to be electrically connected.

6. A digitizing tablet according to claim 5, wherein each of said individual grid elements comprises outer attaching portions and inner attaching portions, said inner attaching portions of said grid elements being disposed within each one of said plurality of panels proximate said connecting surface, wherein when said connecting surface of said one of said plurality of panels is adjacent the connecting surface of said at least one other of said plurality of panels, said inner attaching portions of said one and said at least other of said plurality of panels are sufficiently proximate to each other so that a coil, when placed proximate said seam, induces a same but opposite voltage in said inner attaching portions of said one and said at least other of said plurality of panels, wherein a net voltage is zero.

7. A digitizing tablet according to claim 5, wherein each of said individual grid elements comprises outer attaching portions and inner attaching portions, said inner attaching portions of said grid elements being disposed within each one of said plurality of panels proximate said connecting surface, wherein when said connecting surface of said one of said plurality of panels is adjacent the connecting surface of said at least one other of said plurality of panels, said at least one terminating portion of said one and said at least other of said plurality of panels is positioned between said inner attaching portions thereof, wherein a coil, when placed proximate said seam, induces a same but opposite voltage in said at least one terminating portion and said attaching portions of said one or said at least other of said plurality of panels, so that a net voltage is zero.

8. A digitizing tablet according to claim 5 further comprising means for pivotally connecting each of said plurality of panels together.

9. A digitizing tablet according to claim 5, wherein said plurality of spaced generally parallel portions are equally spaced and parallel to each other.

10. A digitizing tablet comprising:

at least two panels, and means for connecting said at least two panels;

wherein said digitizing tablet further comprises grid means disposed within each of said at least two panels for generating a single continuous conductor grid defining a single XY coordinate system, and wherein said at least two panels are adjacent to each other defining a seam therebetween, wherein said grid means defines at least a first grid element within a first of said at least two panels, a second grid element within a second of said at least at least two panels and at least one terminating portion within at least one of said first and second panels, wherein a coil, when placed proximate said seam, induces a same but opposite voltage in said first grid element or said second grid element and said terminating portion so that a net voltage is zero, whereby said seam is transparent so as to generate said single continuous conductor grid.

* * * * *

UNITED STATES PATENT AND TRADEMARK OFFICE
CERTIFICATE OF CORRECTION

PATENT NO. : 6,011,545
DATED : January 4, 2000
INVENTOR(S) : Phillip L. Henderson, David J. Porter It is certified that error appears in the above-identified patent and that said Letters Patent are hereby corrected as shown below: On the title page, item:

[73], Assignee "Numoncis, Inc." should be deleted and replaced with - -Numonics, Inc.- -.

Signed and Sealed this

Eighth Day of May, 2001

*Attest:*

NICHOLAS P. GODICI

*Attesting Officer*     Acting Director of the United States Patent and Trademark Office